United States Patent [19]
Gougeon et al.

[11] Patent Number: 5,704,172
[45] Date of Patent: Jan. 6, 1998

[54] RIGID FOAM BOARD AND FOUNDATION INSULATION SYSTEM AND METHOD FOR TREATING SAME WITH INSECTICIDE/TERMITICIDE

[75] Inventors: Brad Gougeon, Blacklick, Ohio; Brian D. Olson, Geneva, N.Y.; Bruce S. Marks, Wilmington, Del.; Beth A. Colbert, Newark, Ohio

[73] Assignees: The Dow Chemical Company, Midland, Mich.; Dow Elanco, Inc., Indianapolis, Ind.

[21] Appl. No.: 587,431

[22] Filed: Jan. 17, 1996

[51] Int. Cl.$^6$ .................................... E02D 19/00
[52] U.S. Cl. ............... 52/169.11; 52/169.5; 52/169.14; 405/45
[58] Field of Search ............... 52/169.11, 169.14, 52/169.5, 309.4, 309.8; 405/45

[56] References Cited

U.S. PATENT DOCUMENTS

| | | | |
|---|---|---|---|
| 4,309,855 | 1/1982 | Pate et al. | 52/169.5 |
| 4,704,048 | 11/1987 | Ahlgrimm | 405/45 |
| 5,056,281 | 10/1991 | McCarthy | 52/169.5 |
| 5,149,726 | 9/1992 | Deblander | 521/143 |
| 5,363,621 | 11/1994 | Kroll et al. | 52/506.01 |
| 5,392,578 | 2/1995 | Kroll et al. | 52/506.1 |

FOREIGN PATENT DOCUMENTS 3115026  10/1982  Germany ............... E04B 1/62

*Primary Examiner*—Carl D. Friedman
*Assistant Examiner*—Beth Aubrey
*Attorney, Agent, or Firm*—J. Robert Dean, Jr.

[57] ABSTRACT

Disclosed is a rigid polymer foam board suitable for use in a foundation insulation system. The foam board has a face defining a plurality of grooves therein which traverse in a crossing, diagonal configuration. The groove configuration facilitates the application of insecticides/termiticides in foundation insulation systems employing rigid foam boards on the exterior of the foundation.

8 Claims, 3 Drawing Sheets

RIGID FOAM BOARD AND FOUNDATION INSULATION SYSTEM AND METHOD FOR TREATING SAME WITH INSECTICIDE/ TERMITICIDE

This invention relates to a method for treating an foundation insulation system with an insecticide/termiticide. The invention further relates to a foundation insulation system.

BACKGROUND OF THE INVENTION

A common area of heat loss in a building is the foundation, which typically is located partly above grade and partly below grade. The foundation is typically constructed of building materials such as concrete, stone, or masonry. While providing necessary building strength and support, such materials are typically porous and do not provide adequate insulation.

Increasingly, local building codes are requiring foundations be insulated. Foundations may be insulated at the interior or the exterior depending upon preference and design of the foundation.

In many foundation insulation systems, especially those of residential houses and buildings, it is advantageous to insulate the foundation on the outside because of ease of installation and the desirability of erecting barriers to the outside of the foundation to help prevent moisture penetration and to facilitate water drainage. Insulating foams such as those of rigid extruded polystyrene and expanded polystyrene have been employed in the form of rectangular panels or boards on the exterior of foundation walls to provide necessary insulation, prevent moisture penetration, and facilitate drainage. Foundation insulation systems employing polystyrene foam boards are seen in U.S. Pat. Nos. 4,309,855, 4,704,048 and 5,056,281.

A problem with employing rigid foam boards on the exterior of the foundation walls is that the boards separate the foundation walls from any insecticide/termiticide-treated areas of the backfill abutting the foundation walls. Backfill is typically treated with insecticides/termiticides to prevent migration of insects/termites from the outdoors to buildings. Termites dig underneath the areas of treated backfill and crawl up the interface between the boards and the foundation wall to access areas of wood content in the building.

One method of dealing with the problem of insect/termite infiltration via the rigid foam board foundation wall interface is to impregnate the boards with insecticide/termiticide during the manufacture of the foam or to post-treat with same after manufacture. Problems with this method include product stewardship concerns as well as leaching or washing of the insecticide/termiticide from the boards over time. When a substantial portion of the insecticide/termiticide has leached or washed from the foam, insecticidal/termiticidal resistivity decreases.

Another method of dealing with the problem of insect/termite infiltration is to employ a foam board having a certain average cell size and density to entrap the insects/termites in individual cells as they attempt to burrow their way through the foam such as seen in U.S. Pat. No. 5,149,726. While such a foam board prevents penetration by insects/termites it does not prevent them from crawling up the foam board/foundation wall interface.

It would be desirable to have a foundation insulation system which provided adequate insulation capability yet was resistant to insect/termite infiltration. It would also be desirable to be able to treat and re-treat the foundation insulation system with an insecticide/termiticide as often as necessary to ensure continual and long-term resistance to termite infiltration.

SUMMARY OF THE INVENTION

According to the present invention, there is a method for treating an insulating foundation wall with an insecticide/termiticide. The method comprises:

a) providing a foundation wall having an exterior face;
b) providing a rigid foam board having opposing first and second faces wherein grooves are defined in and traverse the first face of the foam board;
c) positioning the first face of the foam board flush to the exterior face of the foundation wall;
d) backfilling adjacent the second face of the foam board such that only a portion of the foam board is exposed; and
e) applying liquid insecticide into the grooves of the foam board at the exposed portion thereof.

Further, according to the present invention, there is a rigid foam board useful in a foundation insulation system. The board has a first and second face and has crossing, diagonally disposed grooves defined in and traversing the first face of the board.

Further, according to the present invention, there is a foundation insulating system comprising a foundation wall, a rigid foam board, and backfill. The foam board has a first and second face and has crossing, diagonally disposed grooves defined in and traversing the first face of the board. The first face of the rigid foam board is adjacent and flush to an exterior face of the foundation wall. The backfill is adjacent and flush to the second face of the foam board such that only an upper portion of the foam board is exposed.

BRIEF DESCRIPTION OF THE DRAWINGS

The features of the present invention will be better understood upon viewing the drawings together with the remainder of the specification.

DETAILED DESCRIPTION

The present invention addresses the problem of insect/termite infiltration by providing a foundation insulation system and a method for applying an insecticide/termiticide such that the interface between the rigid foam board and the foundation wall is protected from infestation and is not permitted to become a conduit for insects/termites to other areas of the foundation or building. The interface is protected by providing a grooved surface at the face of the rigid foam board adjacent to and flush with the foundation wall such that insecticide/termiticide may be effectively and evenly distributed throughout the foundation insulation system. The insecticide/termiticide can be distributed within the system with minimal expense and effort.

Grooves may be formed in the foam board in any manner known in the art. The grooves may be cut, impressed, or embossed within a surface or surfaces of the board. The preferred means of forming the grooves is to impress the groove within the structure by means of a wheel, roller, or other type of rotary device preferably when the foam is in its most compressible or thermoformable stage immediately or soon after extrusion.

The width, depth, and incidence of the grooves into and along the face of the rigid foam board is not critical as long as they are configured to ensure effective distribution of the insecticide/termiticide both laterally and vertically along the grooved face of the foam board. Groove depth will preferably be about 0.20 centimeters or more and most preferably be about 0.20 to about 0.40 centimeters. Preferably, groove width will be about 0.20 to about 0.80 centimeters. The grooves are preferably situated from about 1 centimeter to about 15 centimeters apart on center and more preferably are situated about 6 centimeters to about 14 centimeters apart on center along the width of the foam board.

The grooves may be configured or have any shape in the rigid foam board as long as the insecticide/termiticide applied to the upper portions of the foam board are afforded a generally vertical and horizontal, gravity induced pathway to ensure transport of the insecticide/termiticide down the entire length of the board. Possible groove shapes include rectangular and semicircular or concave.

Figure 1:
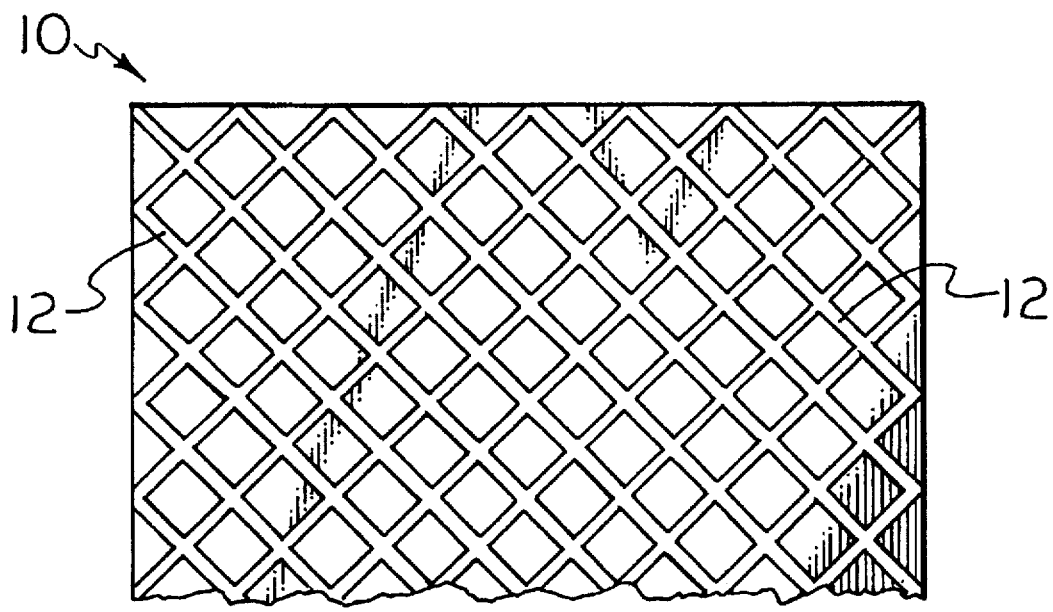
FIG. 1 shows a fragmentary, plan view of a rigid foam board useful in the foundation insulation system of the present invention.
Figure 2:
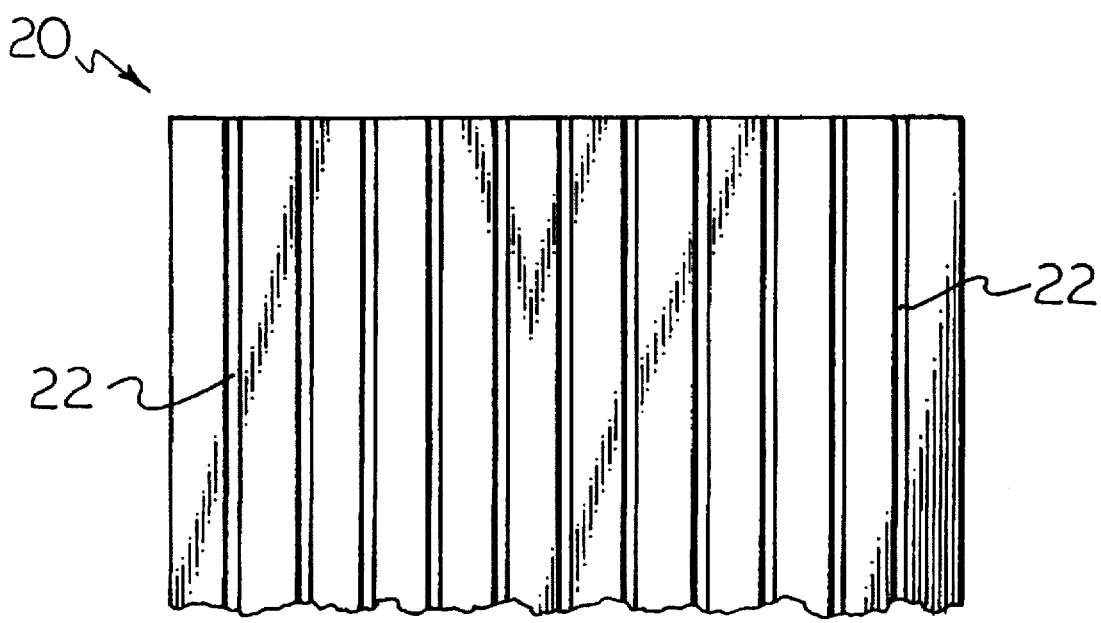
FIG. 2 shows a fragmentary, plan view of another rigid foam board useful in the foundation insulation system of the present invention.

Though not to be construed as limiting, foam boards with two possible groove configurations are illustrated. In FIG. 1, a preferred foam board 10 has grooves 12 having continuous, parallel grooves in a crossing diagonal pattern with respect to the length of the board. In FIG. 2, a foam board 20 has grooves 22 having a continuous, parallel configuration directional with the length of the foam board. Diagonally disposed grooves cross one another as they traverse a face (surface) of the board. The crossing diagonal groove configuration is preferred because it affords a greater dispersion of the insecticide/termiticide vertically and laterally across the face of the board and the surface of the foundation wall against which the face abuts or is adjacent and flush to. A preferred angle of crossing is about 45 degrees with respect to the edges of the foam board.

The rigid foam is preferably provided in the form of a relatively thin, rectangular board. Common board sizes are 2 feet by 8 feet (61 centimeters (cm) by 244 cm) and 4 feet by 8 feet (122 cm by 244 cm) in width and length. Common board thicknesses range from 0.5 inch to 2 inches (1.2 cm to 5.1 cm).

Figure 3:
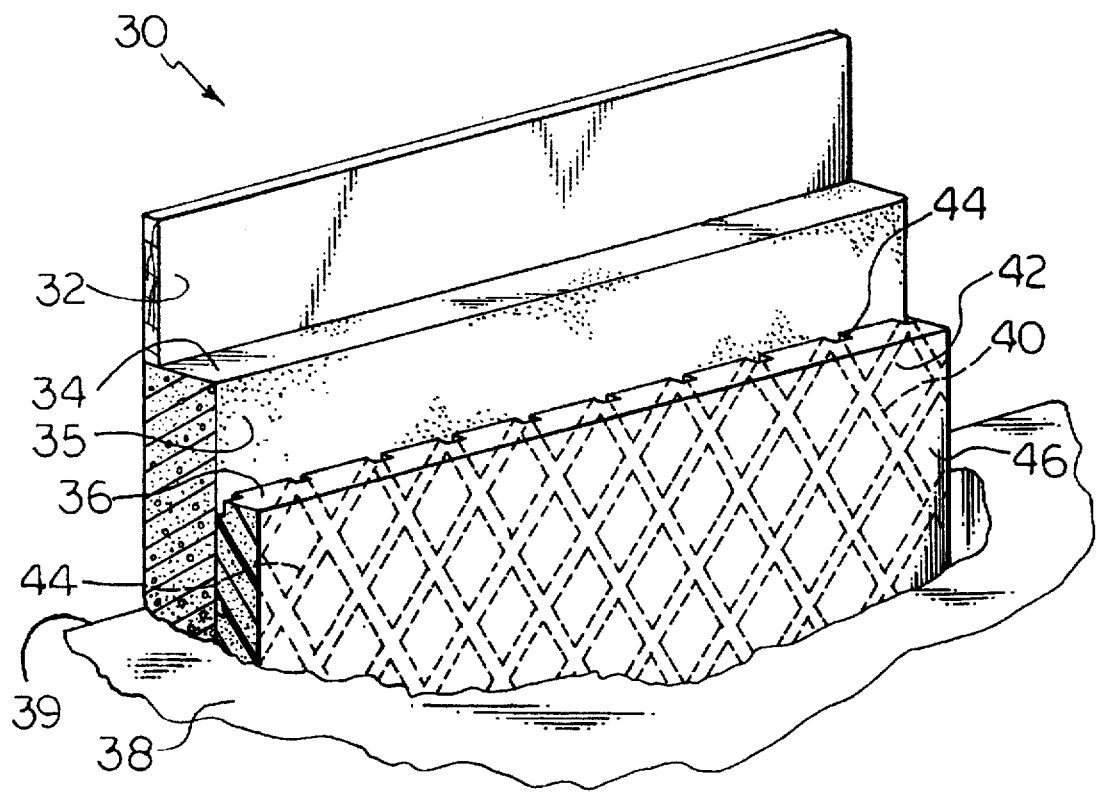
FIG. 3 shows a cutaway perspective view of a foundation insulation system of the present invention.

A foundation insulation system according to the present invention is shown as foundation system 30 in cutaway in FIG. 3. Foundation system 30 comprises a building wall 32, a foundation wall 34, a rigid foam board 36, and backfill 38. Foam board 36 has opposing first and second faces 40 and 42. Foam board 36 has grooves 44 in a crossing, diagonal configuration. Grooves 44 are defined within first face 40. First face 40 is placed flush or adjacent to or in abutment with an exterior face 35 of foundation wall 34. If desired, foam board 36 may be affixed to exterior face 35 by means of a conventional adhesive (not shown) or by mechanical fasteners (not shown). The area adjacent foundation wall 34 and second face 42 of foam board 36 is filled with backfill 38 such that only a top portion 46 of foam board 36 remains exposed above grade level 39 of backfill 38. Backfill 38 may take the form of any type known such as gravel, soil, or clay.

Figure 4:
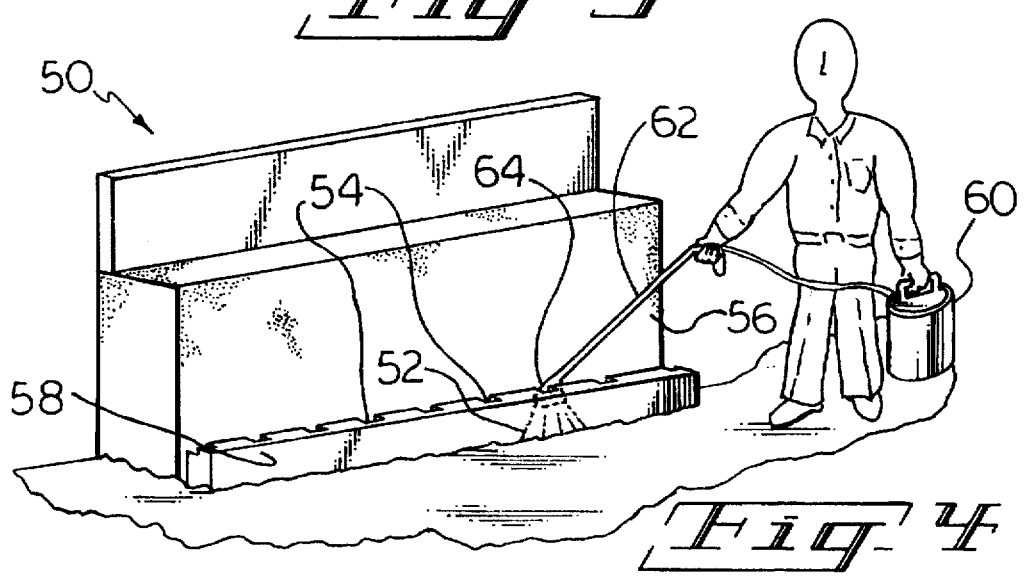
FIG. 4 shows a perspective view of a foundation insulation system being treated with an insecticide/termiticide in accordance with the present invention.

A foundation insulating system 50 according to the present invention is treated as shown in FIG. 4 by spraying an insecticide/termiticide 52 into grooves 54 at an exposed top portion 56 of a foam board 58. Insecticide/termiticide 52 then flows and disperses down through grooves 54 into the greater groove system of foam board 58. Insecticide/termiticide 52 can be sprayed into the grooves 54 by any conventional sprayer known in the art. FIG. 4 shows insecticide/termiticide 52 being sprayed with a hand-held sprayer device 60 having a wand 62 with a right-angle nozzle 64. It is particularly advantageous to use a sprayer having a right-angle nozzle because of the wide spray angle it affords. The use of a right-angle nozzle reduces the chance that grooves will be missed during the spraying process.

Figure 5:
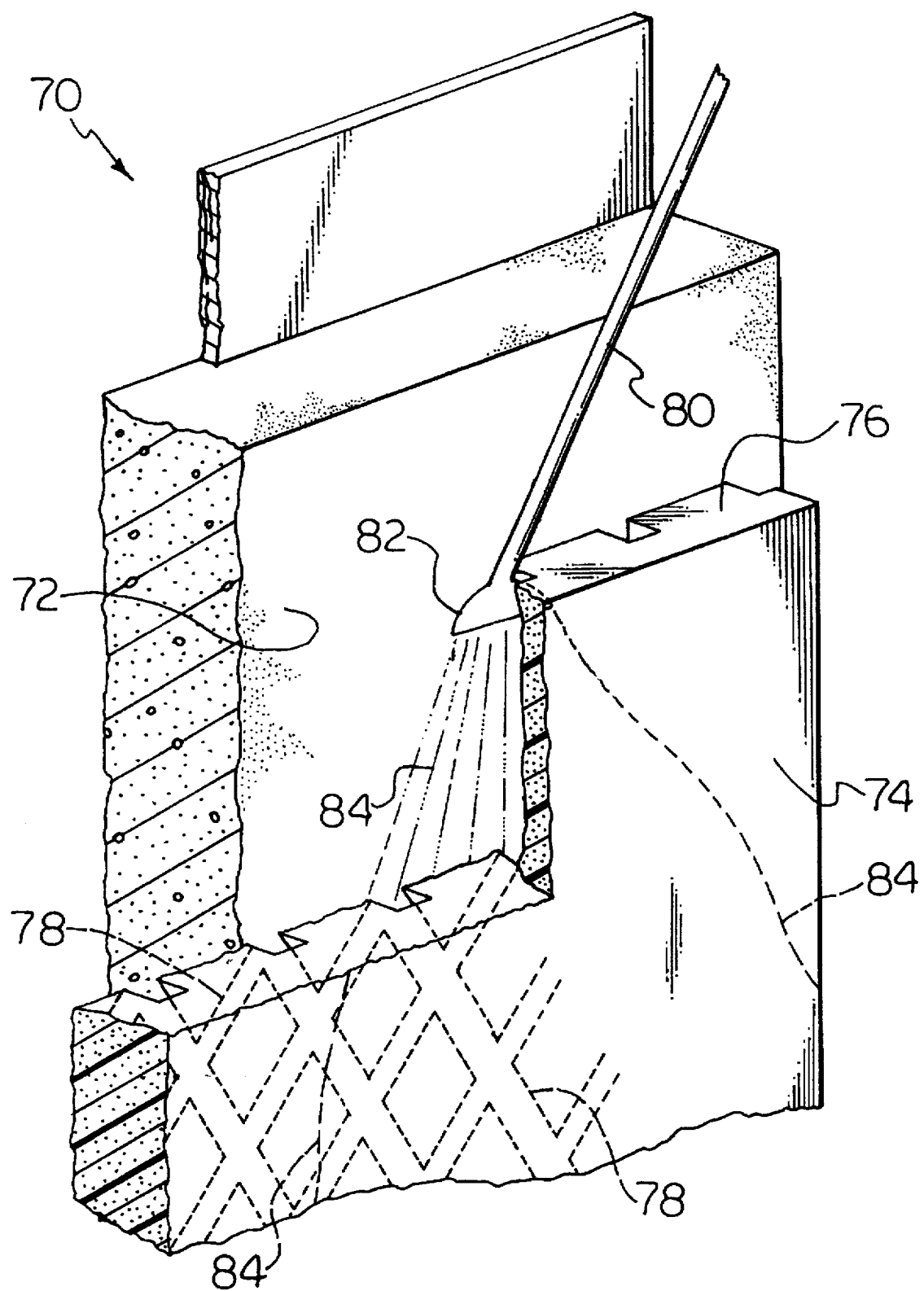
FIG. 5 shows a perspective, cutaway view of a portion of a foundation insulation system being treated with an insecticide/termiticide in accordance with the present invention.

A foundation insulation system 70 according to the present invention is treated as shown in FIG. 5 by spraying an insecticide/termiticide 84 into grooves 78 at an exposed top portion 76 of a foam board 74 between the foam board 74 and a foundation wall 72. Insecticide/termiticide 84 is conveyed through wand 80 and out of nozzle 82. Insecticide/termiticide 84 then flows and disperses down through grooves 78 into the greater groove system of foam board 74.

The insecticide/termiticide may be sprayed into the grooves by any of several different methods. A preferred method is to insert the nozzle of the sprayer at the exposed top portion of the foam board between the foam board and the exterior face of the foundation wall at a groove in the center of the width of the foam board. A flat, right angle configuration for the nozzle facilitates insertion between the foam board and the foundation wall. The insecticide/termiticide may also be sprayed directly (not shown) into the exposed grooves at the top of the foam board. It is also possible to spray into an orifice (not shown) located within the exposed top portion of the foam board; the orifice would be in fluid connection with the groove system and adapted to receive and convey the insecticide/termiticide to the system.

If desired, a cover (not shown) or a protective layer or membrane (not shown) may be placed across the top of the foam board to assist in preventing dirt or debris from entering or clogging the exposed grooves after installation of the foam board.

An advantageous feature of the present invention is that it is possible to re-treat the insulation with insecticide/termiticide as often as necessary. Preferably, the foundation insulation system will be re-treated with insecticide/termiticide every few years.

Insecticides/termiticides useful in the present invention include any of those known in the art. The insecticides and termiticides is formulated in a liquid, fluid, or foam form such that effective and even distribution through and along the grooves of the rigid foam board is possible. The insecticides and termiticides may be derived from nature or chemically synthesized. A useful insecticide/termiticide is chlorpyrifos, which is marketed under the tradename DURSBAN® by DowElanco, Inc.

If desired, both sides or faces of the foam board may be grooved. The face which is to abut the exterior surface of the foundation wall is grooved to facilitate the distribution of the insecticide/termiticide. The opposing face abutting or adjacent the backfill may be grooved to facilitate the drainage of water induced by hydrostatic pressure in the backfill. Foam boards having grooves to facilitate drainage of water are seen in U.S. Pat. Nos. 4,309,855, 4,704,048, and 5,056,281.

The foam board having grooves therein with the crossing diagonal configuration has an additional advantage of being positionable both sideways (horizontally) and vertically in a foundation insulation system. This is advantageous because building codes vary regarding the extent of foundation insulation they require.

Suitable plastic materials may be selected from any of those which can be blown into foam. Suitable thermoplastics include polyolefins and alkenyl aromatic polymers. Suitable polyolefins include polyethylene and polypropylene. Suitable alkenyl aromatic polymers include polystyrene and copolymers of styrene and other monomers. Suitable polyethylenes include those of high, medium, low, linear low, and ultra low density types. It is also possible to form grooved foam boards from thermoset polymers such as polyisocyanurate or rigid polyurethane. Thermoplastics are preferred over thermoset polymers in below-grade insulating applications because of the latters' tendency to absorb water.

The present foam structure preferably comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Preferred structures comprise substantially (i.e., greater than 95 percent) and most preferably entirely of polystyrene.

Rigid foam boards particularly useful in the present invention are extruded polystyrene and expanded polystyrene bead foam (bead board). The most preferred rigid insulating foam is extruded polystyrene. Extruded polystyrene foams are preferred because they provide relatively high compressive strength and modulus, are relatively impermeable to water and water vapor, and are capable of retaining insulating cell gas for long periods of time. Extruded polystyrene foams are further preferred because they provide sufficient mechanical strength to substantially retain the shape of grooves which have been cut, pressed, or embossed in a face of the board.

The foam board may be closed cell or open cell according to ASTM D2856-87.

A particularly useful rigid foam board is one having a slightly roughened or non-smooth surface on the face which is to abut the exterior face of the foundation wall. The roughened surface enhances adsorption of the insecticide/termiticide at the surface of the foam. Useful boards are extruded polystyrene foam boards which have been skived at their surfaces (referred to in the art as "cut board").

Another useful rigid foam board is one of an open-cell foam having an open cell content of about 30 to about 80 percent according to ASTM D2856-87. Excellent teachings concerning open-cell foams and processes for making same are seen in U.S. Pat. No. 5,434,195, which is incorporated herein by reference. The open-cell foam structure may allow insecticide/termiticide to permeate into the foam during application to enhance and prolong insecticide/termiticide activity in the foundation insulation system.

The foam board has the density of from about 10 to about 150 and most preferably from about 10 to about 70 kilograms per cubic meter according to ASTM D-1622-88. The foam has an average cell size of from about 0.1 to about 5.0 and preferably from about 0.2 to about 1.5 millimeters according to ASTM D3576-77.

Various additives may be incorporated in the present foam structure such as inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium dioxide, silica, barium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The following are examples of the present invention, and are not to be construed as limiting. Unless otherwise indicated, all percentages, parts, or proportions are by weight.

EXAMPLE

Example 1

A simulated foundation insulation system according the present invention was tested for its liquid distribution capabilities. The system was constructed by clamping a grooved rigid foam board to a sheet of clear acrylic plastic with the grooves facing the plastic sheet. The plastic sheet simulates a foundation wall and allows the flow of liquid through the grooves to be visually observed.

The two grooved boards tested had grooves of a common depth of 0.09 inch (0.23 cm) and different widths of 0.15 inch (0.38 cm) and 0.25 inch (0.65 cm). The grooves were present every 4 inches on center along the width of the rigid foam board. The boards measured 2 feet by 4 feet by one inch (61 centimeters by 122 centimeters by 2.5 centimeters) in width and length and thickness, respectively, and was comprised of closed-cell, extruded polystyrene foam. The grooves were in a crossing, diagonally disposed configuration at 45 degree angles to the edges of the foam board.

Application of an insecticide/termiticide was simulated with water and colored water. The water and colored water were applied through the sprayer nozzle of a hand-pumped, air-pressurized portable sprayer. The nozzle was flat and had a half-angle configuration. The nozzle was inserted between the foam board and the plastic sheet with the top of the nozzle positioned about 2 inches (5 centimeters) below the top of the board and centered along the width of the board in the center of one of the diamond shaped regions in the grooves formed by the intersecting grooves.

Both the water and the colored water were effectively distributed both laterally and vertically across the foam board. The liquid eventually reached all grooves and eventually dripped out the bottom edges of the foam board. Liquid distribution was adequate with boards having both groove sizes with the wider channels being preferred due to their faster and more thorough liquid distribution performance.

While embodiments of the foundation insulation system and the method for treating same of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A foundation insulation system comprising:
   a) a foundation wall having an exterior face;
   b) a rigid foam board having opposing first and second faces, the foam board having crossing, diagonally disposed grooves defined in and traversing the first face of the board; the first face of the foam board being positioned adjacent and flush to the exterior face of the foundation wall;
   c) backfill positioned adjacent to the second face of the foam board such that only an upper portion of the foam board is exposed.

2. The method of claim 1, wherein the rigid foam is an extruded polystyrene foam.

3. The method of claim 1, wherein the rigid foam is a polystyrene bead foam.

4. A method for treating an insulating foundation wall with an insecticide/termiticide, comprising:
   a) providing a foundation wall having an exterior face;
   b) providing a rigid foam board having opposing first and second faces wherein grooves are defined in and traverse the first face of the foam board;
   c) positioning the first face of the foam board adjacent and flush to the exterior face of the foundation wall;
   d) backfilling adjacent the second face of the foam board such that only a portion of the foam board is exposed;
   e) applying insecticide/termiticide into the grooves of the foam board at the exposed portion thereof.

5. The method of claim 4, wherein the rigid foam board provided has grooves which are defined in and traverse the first face of the board in a crossing, diagonally disposed configuration.

6. The method of claim 4, wherein the insecticide/termiticide is applied by spraying between the rigid foam board and the exterior face of the foundation wall at the exposed portion of the rigid foam board.

7. The method of claim 4, wherein the rigid foam board provided is an extruded polystyrene foam board.

8. The method of claim 4, wherein the rigid foam board provided is a polystyrene bead foam board.

* * * * *